T. T. CLARK.
CIRCULAR COUNTER LOCKING DEVICE.
APPLICATION FILED AUG. 14, 1917.
1,274,991.
Patented Aug. 6, 1918.
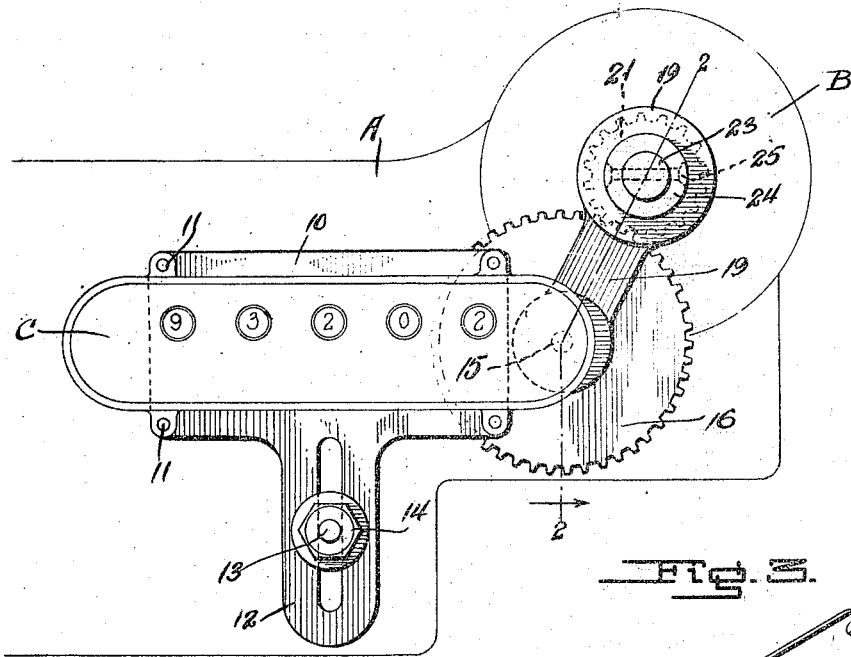
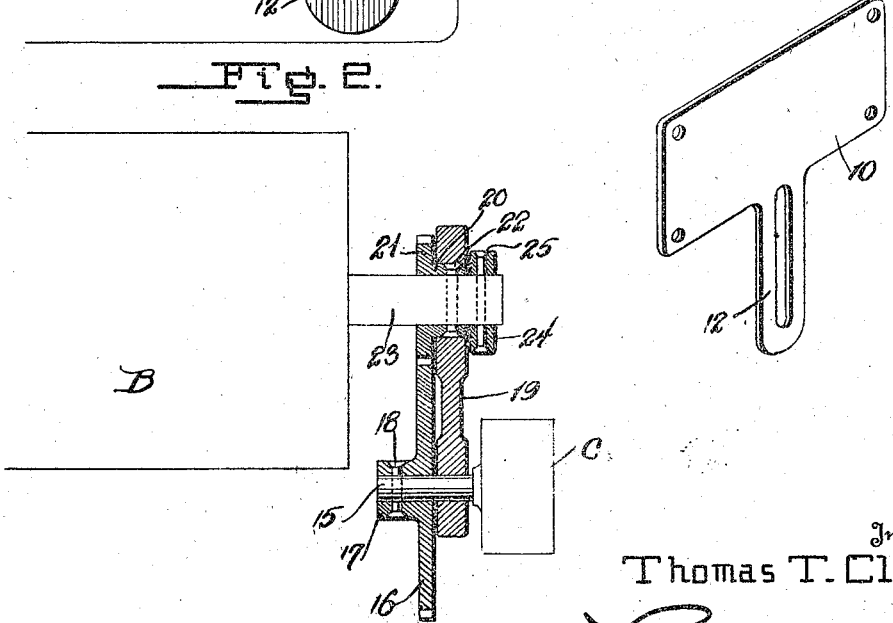
Inventor
Thomas T. Clark

UNITED STATES PATENT OFFICE.

THOMAS T. CLARK, OF ANDOVER, MASSACHUSETTS.

CIRCULAR-COUNTER-LOCKING DEVICE.

1,274,991.    Specification of Letters Patent.    Patented Aug. 6, 1918.

Application filed August 14, 1917. Serial No. 186,144.

*To all whom it may concern:*

Be it known that I, THOMAS T. CLARK, a citizen of the United States, and resident of Andover, in the county of Essex and State of Massachusetts, have invented certain new and useful Improvements in Circular-Counter-Locking Devices, of which the following is a specification.

The present invention relates to counters or registers for application to machines for handling fabric, paper, or the like, or to machines having rotating parts, the number of revolutions of which are to be counted or registered, and relates particularly to a novel means for locking the counter to the machine.

An object of the present invention is to provide a locking means for securing a counter to a machine to prevent the unauthorized removal of the counter or operation or adjustment of the same independently of the part of the machine to which the counter is attached; to provide a locking attachment of this character which comprises but relatively few parts and which may be quickly and easily assembled and secured to the rotating part of the machine.

The above, and various other objects and advantages of this invention will be in part understood, and in part described, from the following detail description of the present preferred embodiment, the same being illustrated in the accompanying drawings wherein—

Figure 1 is a front elevation of a counter having the locking attachment of this invention applied thereto, the outline showing diagrammatically a machine to which the counter and the locking attachment may be applied.

Fig. 2 is a transverse section taken through the plane substantially on the line 2—2 of Fig. 1.

Fig. 3 is a detail perspective view of the bracket, plate and lug for holding the counter upon the machine.

Referring to this drawing, A designates generally the frame of a machine provided with a delivery or like roll B, to which is adapted to be attached or connected a counter C. The counter C may be of any approved construction, and forms no part of the present invention.

A bracket plate 10 is provided which is of elongated form, is adapted to engage across the rear side of the counter C and be secured thereto by screws 11 or the like, which preferably pass outwardly through the bracket plate 10 and the lugs or projections of the counter C. The bracket plate 10 is provided with a depending longitudinally slotted arm 12 adapted to receive a bolt 13 therethrough, the bolt having a clamping nut 14 bearing against the outer side of the arm 12 to hold the bracket plate 10 in the desired position of elevation.

The counter C is provided with a shaft 15 upon the outer end of which is mounted a gear-wheel 16, the latter having a hub 17 which is secured to the shaft 15 by a transverse pin 18, the latter being headed at opposite ends and seated in countersinks in the peripheral surface of the hub 17. The gear-wheel 16 may turn with the counter-shaft 15, but can not be removed therefrom until the pin 18 is drilled out of the hub 17. A connecting arm or link 19 is apertured at opposite ends, and one end is engaged over the shaft 15 between the counter C and the gear-wheel 16 which is fixed or pinned to the shaft. The arm or link 19 is permanently secured to the shaft 15 and can only be removed therefrom by the removal of the gear-wheel 16.

The opening in the outer end of the arm or link 19 is relatively large and is adapted to receive therein the hub 20 of a pinion 21. The hub 20 is of a length corresponding to the thickness of the outer end of the link 19, and is secured by a pin 22 to a rotary shaft 23 which supports the delivery roll B. The pin 22 is preferably headed at opposite ends and the heads are countersunk in the peripheral surface of the hub 20. The hub 20 fits snugly in the opening in the outer end of the link 19 and is adapted to turn therein when the pinion 21 is rotated. The gear-wheel 16 and the pinion 21 are held against the inner side of the link 19, and intermesh so that upon the rotation of the pinion 21 the gear-wheel 16 and the shaft 15 are turned. A collar 24 is mounted upon the outer end of the shaft 23 and is fixed thereon by the provision of a transverse pin 25 which engages through the collar and the shaft, and which has its opposite ends headed and countersunk in the peripheral surface of the collar 24.

It will be noted that all of the pins 18, 22 and 25 have their heads countersunk in the peripheries of their respective members so that access cannot be readily had to the pins for removing the same. In each instance, the pin must be drilled out of its supporting member before the member may be removed from interlocking engagement with the link or arm 19.

It will then be seen that when the parts are thus so assembled and the counter C is secured to the side of the machine, the gear-wheel 16 cannot be turned by hand without rotating the pinion 21 and the delivery roll B, and that the application of suitable tools or implements is necessary to pins which hold the parts in their respective positions before the parts may be separated from the link or arm 19.

It is of course understood that various changes and modifications may be made in the details of construction and design of the above specifically described parts without departing from the spirit of this invention, such changes and modifications being restricted only by the scope of the following claims.

What is claimed is:

1. In a counter locking device, the combination with a machine having a rotating shaft and a counter having a rotating shaft adapted to be applied to the machine, of a gear-wheel permanently attached to counter-shaft, a radially extending arm mounted on the counter-shaft between the counter and the gear-wheel, said arm having an opening in its outer end to receive the shaft of the machine therethrough, a pinion fixed upon said shaft at one side of the arm and adapted to mesh with said gear-wheel, and a collar fixed to said shaft of the machine at the opposite side of the arm to permanently hold the latter to the shaft.

2. In means for locking counters to machines, the combination of a machine having a rotating shaft, and a counter having a rotating shaft adapted to be connected to the shaft of the machine, a gear-wheel fixed upon the counter-shaft, a pinion fixed upon the shaft of the machine and adapted to mesh with said gear-wheel, a link having openings in opposite ends adapted to receive said shafts therethrough for holding the pinion in meshing engagement with said gear-wheel, and means for securing said link from detachment from the shaft of the machine.

3. In means for locking counters to machines, the combination of a machine having a rotary shaft, of a counter having a rotary shaft, of a link having openings in opposite ends adapted to receive said shafts therethrough, a gear-wheel mounted upon the countershaft beyond the adjacent end of the link, a pin positioned transversely through the hub of the gear-wheel and the counter-shaft to lock the gear-wheel to the shaft and retain the link from removal from the shaft, a gear-wheel mounted on the shaft of the machine and having a hub adapted to project into the opening at the adjacent end of the link, a pin positioned transversely through the hub of the pinion and the machine shaft for securing the pinion thereto, and means for retaining the hub of the pinion within the opening of the link with the end of the pin in the hub of the pinion lying in the plane of the link.

THOMAS T. CLARK.